Figure 1:
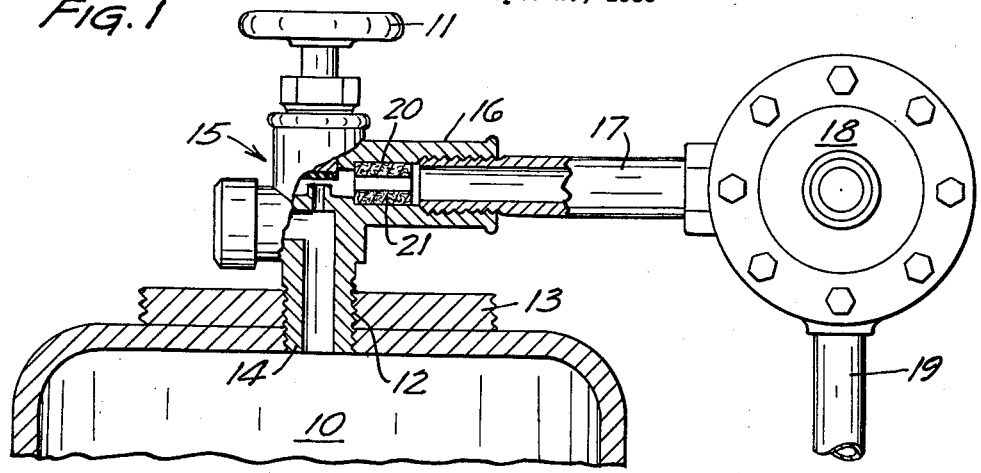

Feb. 16, 1965   J. B. CALVA   3,169,839
ODORIZING OF LIQUIFIED GAS
Filed Sept. 23, 1959

INVENTOR
JOSÉ B. CALVA
BY
Gilbert B Gehrenbeck
AGENT united States Patent Office 3,169,839
Patented Feb. 16, 1965

3,169,839
ODORIZING OF LIQUIFIED GAS
José B. Calva, 204 Upper Midwest Bldg., Minneapolis,
Minn., assignor of one-half to George W. Benz, St. Paul,
Minn.
Filed Sept. 23, 1959, Ser. No. 841,853
8 Claims. (Cl. 48—195)

This invention relates to the odorizing of gases or vapors from liquified petroleum gases. This application is a continuation-in-part of my copending application Serial No. 300,703, filed July 24, 1952, now abandoned, as a continuation-in-part of my earlier application Serial No. 257,903, filed November 23, 1951, now Patent No. 2,919,981.

Prior to this invention it has been accepted practice to add small amounts of volatile odorant materials to liquified petroleum gases. Volatilization of the odorant along with the liquified gas is relied on to impart sufficient odor to the resulting vapor so that leakage may be detected. Typically, small amounts of ethyl mercaptan or the like have been added to the pressure-cylinders containing the liquified petroleum gas. These volatile sulfur-containing odorants are less volatile than the liquified petroleum gas, particularly at low temperatures. Since sufficient odorant must be present in the full cylinder to provide adequate odorization, it is apparent that an excess of the odorant will accumulate in the cylinder as the gas is used. The increasing concentration then tends to supply an excess of odorant to the last portions of the gas. Combustion of petroleum vapors containing excessive amounts of mercaptans produces corrosive and noxious fumes, and is to be avoided.

The difficulty is increased in the presence of traces of water and anti-freeze materials in which the odorants are much more soluble than in the liquified petroleum gas, and under low temperature conditions.

Attempts have previously been made to equalize the concentration of odor in the vapors of liquified petroleum gas. In one such attempt, the odorized vapor was passed through a container of finely divided charcoal for the purpose of adsorbing excess odorant during periods of excessive intensity and releasing it during periods of low intensity. Adsorbents such as charcoal which are capable of selective removal of noxious vapors from gas streams do not again release the material to the gas stream unless heated, steamed or the like. Military gas masks afford an effective example; a mask worn during a gas attack does not then poison the wearer when worn in uncontaminated air.

The inability of the system just described to control the odor level of the vapors of liquified petroleum gases has also been shown in the laboratory. Propane gas obtained from a cylinder of the liquified gas and containing ethyl mercaptan odorant at a concentration of about 3.4 parts per million was passed at a pressure of 11 inches of water and at a rate of 1.2 cubic feet per hour through a tube filled with powdered charcoal. The tube was ½ inch long and ½ inch in diameter. The gas issuing from the tube during 20 minutes was analyzed and found to contain only 0.06 p.p.m. of ethyl mercaptan. Flow of gas through the tube was continued until the charcoal was saturated with the mercaptan; the gas coming from the tube was then again analyzed and the concentration of ethyl mercaptan found to be the same as in the input gas. An excess of liquid mercaptan, six drops, was next added to the charcoal in the tube, and gas again passed therethrough and analyzed. The effluent gas contained greater than 1000 p.p.m. of the mercaptan. Combustion of this gas produced highly corrosive fumes. Passing the gas through a second tube of fresh charcoal reduced the mercaptan content to about 1.3 p.p.m.

An additional difficulty experienced with the just-described prior art method is due to the powdery nature of the absorbent material. The charcoal or other dusts or fine powders are easily carried by the vapor stream and soon tend to plug burner orifices and prevent proper seating of valves. Attempts to prevent such difficulties by filtering require such fine filters as to impose excessive flow resistance on the vapor, particularly as the filters become plugged with the powdery absorbents.

These and other difficulties are avoided in the present invention. There is provided means and method for effectively, safely and uniformly odorizing the vapors of liquified petroleum gases commonly supplied in pressure-cylinders, such as propane, butane and pentane and mixtures thereof. The odorant provides adequate warning without danger of corrosion from products of combustion under all normal conditions of use. The system is particularly effective in providing increased level of odorization under conditions of minimum flow, so that small leaks involving restricted amounts of vapor may be detected as effectively as the escape of larger amounts. There is provided an odorant cartridge, located in the vapor stream and preferably at full tank pressure, and containing a high-boiling odorant liquid capillarily held therein for liberation to the vapor stream and in sufficient amount to effectively odorize the entire tank contents.

These and other novel features and advantages of the present invention will be more clearly and fully set forth in the following specification and claims.

Figure 2:
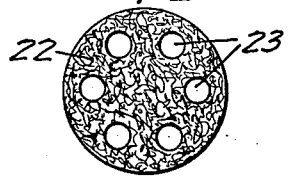
Figure 3:
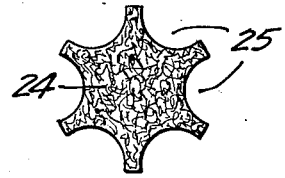
Figure 4:
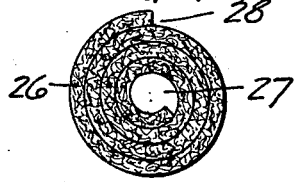
Figure 5:
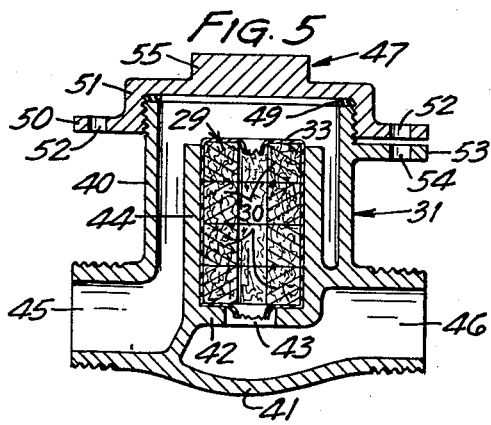
Figure 6:
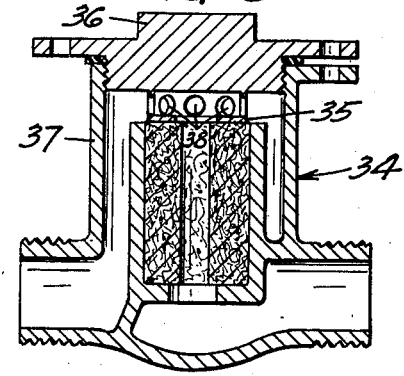
Figure 7:
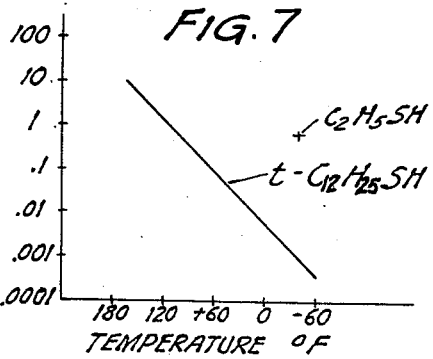

In the drawings:
FIGURE 1 is a partial elevation, mainly in section, of a liquified petroleum gas tank and valve members, showing a preferred location of the odorant cartridge;
FIGURES 2, 3 and 4 are end views of illustrative alternative forms of odorant cartridges;
FIGURES 5 and 6 are sectional elevations of illustrative gas line fittings together with alternative forms and locations of odorant cartridges; and
FIGURE 7 is a graph showing the vapor pressure-temperature relationship of a preferred odorant.

FIGURE 1 indicates in general the relationship of parts in my gas odorizing system. The gas tank 10 carries a threaded ring-shaped boss 13 having external threads for receiving a valve-protecting cover, not shown, and having a threaded central aperture 12 which provides access to the contents of the tank 10, and accommodates the hollow inlet shank 14 of a valve 15.

The valve 15 has a flow control mechanism operated by handle 11, and is provided with an outlet 16 to which piping 17 is secured to connect the valve to a pressure regulating valve 18 which in turn is connected to a pipe line 19 leading to the stove, furnace, heater or other device in which the gas is burned or otherwise consumed.

The outlet 16 of valve 15 is provided with a chamber 20 for accommodating an odorant cartridge 21. Removal of the connecting pipe 17 provides access to the cartridge 21, which can then be removed and replaced through the open-ended outlet 16.

The cartridge 21 is illustrated as cylindrical in shape and having a single longitudinal central open passage. Alternative forms are shown in FIGURES 2-5. In each instance there is provided at least one unobstructed aperture means for unobstructed passage of the vapor. The cartridge 22 of FIGURE 2 is provided with a series of angularly spaced holes 23 extending longitudinally therethrough. The cartridge 24 of FIGURE 3 has a series of angularly spaced longitudinal peripheral grooves or notches 25 which, in cooperation with the close-fitting wall of the chamber 20, provide the required unobstructed aperture means. Cartridge 26 of FIGURE 4 has a central passage 27 as does cartridge 21, and in addition a peripheral groove 28. Where each of cartridges 21, 22, 24 and 26 are unitary, the somewhat larger cartridge 29 included in FIGURE 5 is made of a series of disc-like layers 30.

The modified fittings of FIGURES 5 and 6 may be employed in situations in which an enlarged chamber 20 in a valve 15 is not available, or in conjunction with tanks of larger capacity, or in other instances as desired. The fitting 31 of FIGURE 5 includes a hollow body having a generally cylindrical body portion 40 having a closed lower end 41. A partition wall 42 is supported preferably on a plane normal to the axis of the cylindrical portion 40, this partition wall having one or more apertures 43 extending therethrough. A sleeve 44 extends upwardly from the partition wall 42 to contain the odorant cartridge 29. The sleeve 44 is spaced from the outer wall 40 to provide a passage in communication with an inlet extension 45 on one side of the body 40. A tubular outlet 46 is provided on the opposite side, the outlet being in communication with the underside of the partition wall 42. When the cartridge 29 is supported upon the partition wall, the gas may flow from the inlet 45 through or around the cartridge and through the aperture 43 to the outlet 46.

A cap 47 is threaded onto the upper end of the body 40; a sealing gasket 49 prevents leakage of gas from the fitting. The projection 55 is multi-sided for rotation with a wrench. A flange 50 encircles the internally threaded skirt 51 of the cap 47, and is provided with angularly spaced openings 52. A lug 53 projects from the tubular body 40 and is provided with an aperture 54 to cooperate with an aperture 52 of the flange 50 for accommodating a seal or lock.

The fitting 34 of FIGURE 6 is very similar to that of FIGURE 5, the main point of difference lying in the addition of the retaining member 35. The cap 36 extends downwardly within the internally threaded body member 37 and the hollow extension 35 holds the cartridge 39 in place, the apertures 38 providing for flow of gas between inlet and outlet through the fitting and through the odorant cartridge 39 contained therein.

The odorant cartridge will ordinarily be supplied in a hermetically sealed container which is opened just prior to insertion of the cartridge for use, e.g. in the valve outlet in FIGURE 1 or in the fittings of FIGURES 5 or 6. Such a container may comprise a metal cylinder with removable ends or with removable plugs in the ends in line with the free passages in the cartridge. Alternatively, the cartridge may be sealed within a close-fitting envelope of vapor-impervious film, preferably a transparent polymeric film, which is then punctured at appropriate opposite end areas prior to placing the cartridge in the vapor line. FIGURE 5 indicates the odorant cartridge 29 as contained within such an envelope 33, shown punctured centrally at both ends. Where reduced surface area is desired for limiting the rate of odorization, while still permitting full flow of vapor, more or less of the interior surfaces of the odorant cartridge may similarly be covered, e.g. with a tubular insert of metal or semi-rigid plastic film.

The apertured cartridges of my invention are sufficiently rugged to permit handling, e.g. as in inserting them into the valve of FIGURE 1 or removing them therefrom, without any powdering or other loss of particulate of fibrous material. They are porous to permit flow of odorant in liquid form, yet sufficiently fine-structured and compact to be capable of retaining the liquid odorant by capillarity. They are inert toward the vapors and liquids with which they are to come into contact. Dense wool felt is particularly useful in multiple-layer cartridge 29 shown in FIGURE 5. Blotting paper and heavy woven fabric are well adapted for rolling into the form of cartridge shown in FIGURE 4. The cartridges of FIGURES 1–3 are preferably formed of long-fiber chemical paper pulp, e.g. by known molding procedures. Small proportions of inert binder materials, for example regenerated cellulose from cellulose xanthate incorporated with the pulp, aid in further unifying the pulp and preventing any possibility of loss of fiber during use but are normally found to be unnecessary.

It will be observed in conjunction with FIGURE 1 that the odorant cartridge is located on the high pressure side of the pressure-reducing valve 18, so that the cartridge imparts its odorant content to the saturated vapor at full tank pressure and therefore at minimum volume. At very low rates of vapor flow, this permits saturation of the vapor with the odorant, so that maximum odorization is obtained. Small leaks in the system, for example from an accidentally extinguished pilot light, will therefore be made apparent by a high concentration of odorant. At more normal rates, the amount of odorant evaporated into the vapor stream will be decreased, while still being amply sufficient to provide full protection.

Although many specific compounds and classes of compounds have been tested as odorants for liquified petroleum gases, the prior art has universally found it necessary to employ highly volatile materials for such purposes, ethyl mercaptan being an outstanding example. By my improved method and with my novel odorizing system I am now enabled to employ a new class of odorants not previously effective in the treatment of liquified petroleum gas. These materials may be identified as high-boiling odoriferous organic sulfur compounds or mixtures thereof, boiling above 140° C. and having a vapor pressure, measured in millimeters of mercury, of at least about 0.0001 mm. at −40° F. and not exceeding about 10 mm. at 140° F. One such compound is 2,2′-dimercaptoethyl sulfide, having the formula $$HS-CH_2CH_2-S-CH_2CH_2-SH$$

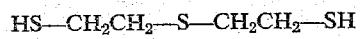

Another and preferred compound is tertiary dodecyl mercaptan, $t-C_{12}H_{25}SH$. The latter compound boils at 210–235° C. (410–455° F.) and has a vapor pressure of 0.028 mm. at 30° F. and 0.00042 mm. at −60° F., which by interpolation indicates a vapor pressure of about 0.001 mm. at −40° F. and, by extrapolation, a vapor pressure of about 5 mm. at 140° F., as indicated in FIGURE 7. The vapor pressure of ethyl mercaptan is much higher, being 0.78 mm. at −40° F. as indicated on the graph of FIGURE 7.

My preferred odorant compounds, exemplified by t-dodecyl mercaptan, are effective over the full range of temperatures ordinarily experienced in the domestic and commercial application of liquified petroleum gas such as propane. They provide adequate odorization at low temperatures while avoiding excessive odorization at high temperatures as ordinarily experienced. Where less temperature variation is anticipated, some relaxation in the above-described requirements may be permitted. For example, in perpetually cold environments an odorant having a somewhat higher vapor pressure at high temperatures of 140° F. or thereabouts may be found useful; and conversely under conditions of continued high temperatures odorants having very low vapor pressure at −40° F. may be utilized in accordance with my invention.

Based on the vapor pressure requirements, it is possible to determine the amount of odorant required for a given quantity of liquified petroleum gas under defined operating conditions, so that adequate odorization of the entire quantity of gas will be provided. Using the techniques and materials here provided, it is found that surprisingly small quantities of odorants are required. As indicated by FIGURE 1, adequate odorant to supply the entire contents of domestic "bottled gas" cylinders may be provided in an odorant cartridge which fits within the release valve on the cylinder itself. The gas or vapor released through such valve is effectively odorized but never excessively odorized. More specifically, a hollow cyindrical cartridge made of dense compact wool felt, one-half inch in diameter and one-half inch long, with a three-thirty-second to three-sixteenth inch diameter passage through its longitudinal center, will capallarily retain 1.3 to 1.5 grams of tertiary dodecyl mercaptan which is sufficient to provide several times the amount of odorant required for the common household size gas tank containing about 20 gallons or 100 pounds of liquified petroleum gas.

What is claimed is as follows:

1. A gas odorizing apparatus adapted for supporting in a gas line a removable odorant cartridge having at least one unobstructed passage means extending from end to end for easy passage of gas therethrough; said apparatus including a hollow body having an inlet and an outlet, a portion between said inlet and outlet, a gas-impermeable sleeve supported by said partition and providing a close-fitting housing for said cartridge, said partition having aperture means therethrough adapted to connect with the passage means of a cartridge contained in said sleeve, and closure means for temporarily opening said apparatus for insertion or renewal of a cartridge.

2. A gas odorizing apparatus adapted for supporting in a gas line a removable odorant cartridge having at least one unobstructed passage means extending from end to end for easy passage of gas therethrough; said apparatus including a hollow body having an inlet and an outlet, a partition between said inlet and outlet, a gas-impermeable sleeve supported at one end on said partition, open at the other end, and providing a close-fitting housing surrounding said cartridge, said partition having aperture means therethrough adapted to connect with the passage means of a cartridge contained in said sleeve, and closure means for temporarily opening said apparatus for insertion or removal of a cartridge.

3. A gas odorizing apparatus adapted for supporting in a gas line a removable odorant cartridge having at least one unobstructed passage means extending from end to end for easy passage of gas therethrough; said apparatus including a hollow body having an inlet and an outlet, a partition between said inlet and outlet, a gas-impermeable sleeve supported at one end on said partition, open at the other end, and providing a close-fitting housing surrounding said cartridge, said partition having aperture means therethrough adapted to connect with the passage means of a cartridge contained in said sleeve, closure means facing said open end for temporarily opening said apparatus for insertion or removal of a cartridge, and open holding means attached to said closure means for retaining said cartridge in said sleeve without interfering with flow of gas therethrough.

4. The method of odorizing the vapor of liquified petroleum gas obtained from a pressure tank containing said liquified gas, comprising the steps of; placing in the directed path of said vapor a small rugged porous unified fibrous body capable of being forcefully inserted into and removed from a closely fitting tubular chamber without significant loss of fibers and having an unobstructed passage-way for said vapor and containing capillarily held therein a liquid odorant material having a vapor pressure insufficient to provide effective odorization of said vapor from a solution of said odorant in said liquified gas, said vapor pressure being at least about 0.001 mm. Hg at 0° F. and not more than about 10 mm. Hg at 140° F., passing said vapor at substantially full tank pressure through said passage-way, and then reducing the pressure of the odorized gas.

5. The method of odorizing the vapor or liquified petroleum gas obtained from a pressure tank containing said liquified gas, comprising the steps of passing the saturated vapor while at substantially tank pressure through an unobstructed passage-way in a small rugged porous unified fibrous body capable of being forcefully inserted into and removed from a closely fitting tubular chamber without significant loss of fibers and containing capillarily held therein a liquid odorant material having a vapor pressure insufficient to provide effective odorization of said vapor from a solution of said odorant in said liquified petroleum gas, said vapor pressure being at least about 0.001 mm. Hg at 0° F. and not more than about 10 mm. Hg at 140° F., and then reducing the pressure of the odorized gas.

6. The method of claim 5 in which the odorant is tertiary dodecyl mercaptan.

7. The method of claim 5 in which the odorant is 2,2'-dimercaptoethyl sulfide.

8. An odorant cartridge adapted to fit within a cavity in the interior of a release valve for a pressure tank containing about 100 pounds of LP gas and comprising a rugged porous unified fibrous hollow cylindrical cartridge approximately one-half inch in diameter and one-half inch long and having a central bore about 3/32 to 3/16 inch in diameter, said cartridge containing capillarily retained therein about 1.3 to 1.5 grams of tertiary dodecyl mercaptan.

References Cited in the file of this patent

UNITED STATES PATENTS

| | | |
|---|---|---|
| 336,573 | Leede | Feb. 23, 1886 |
| 820,146 | Simonds | May 8, 1906 |
| 1,238,068 | Slater | Aug. 21, 1917 |
| 2,113,923 | Miller | Apr. 12, 1938 |
| 2,183,877 | Wilkenson | Dec. 19, 1939 |
| 2,355,550 | Nusbaum | Aug. 8, 1944 |
| 2,919,981 | Calva | Jan. 5, 1960 |